United States Patent [19]

Bjornson et al.

[11] Patent Number: 4,693,991
[45] Date of Patent: Sep. 15, 1987

[54] HYDROTREATING CATALYST COMPOSITION

[75] Inventors: Geir Bjornson; Douglas D. Klendworth; Lloyd E. Gardner; Floyd E. Farha, Jr., all of Bartlesville, Okla.

[73] Assignee: Phillips Petroleum Company, Bartlesville, Okla.

[21] Appl. No.: 919,360

[22] Filed: Oct. 16, 1986

Related U.S. Application Data

[62] Division of Ser. No. 858,772, May 2, 1986, Pat. No. 4,655,906.

[51] Int. Cl.[4] .................. B01J 27/51; B01J 23/28
[52] U.S. Cl. .................. 502/220; 502/307
[58] Field of Search .................. 502/307, 220

[56] References Cited

U.S. PATENT DOCUMENTS

| | | | |
|---|---|---|---|
| 3,915,894 | 10/1975 | Clements et al. | 254/439 |
| 3,969,222 | 7/1976 | Hayes | 208/210 |
| 3,975,259 | 8/1976 | Doelp | 208/213 |
| 4,263,132 | 4/1981 | Drehman et al. | 208/134 |
| 4,283,270 | 8/1981 | McHale | 208/50 |
| 4,287,050 | 9/1981 | Eastman et al. | 208/215 |
| 4,313,820 | 2/1982 | Farha et al. | 208/213 |
| 4,324,647 | 4/1982 | Gardner | 208/111 |
| 4,333,855 | 6/1982 | Gardner et al. | 502/220 |
| 4,371,458 | 2/1983 | Eastman et al. | 502/220 |
| 4,371,507 | 2/1983 | Farha et al. | 423/230 |
| 4,371,728 | 2/1983 | Farha et al. | 585/258 |
| 4,372,842 | 2/1983 | Gardner | 208/254 H |
| 4,376,698 | 3/1983 | Gardner et al. | 208/215 |
| 4,376,699 | 3/1983 | Gardner | 208/215 |
| 4,389,304 | 6/1983 | Eastman et al. | 208/254 M |
| 4,394,301 | 7/1983 | Gardner | 252/455 Z |
| 4,522,709 | 6/1985 | Aldag et al. | 208/216 R |
| 4,541,915 | 9/1985 | Baird, Jr. et al. | 208/65 |

OTHER PUBLICATIONS

Preprints of "Chemistry of Nitrogen Removal", Symposium of Division of Petroleum Chemistry, American Chemical Society, New York, Aug. 23-28, 1981, pp. 924-940, (article by A. M. Tait and A. L. Hensley).

Primary Examiner—Patrick P. Garvin
Attorney, Agent, or Firm—K. K. Brandes

[57] ABSTRACT

A catalyst composition comprises (a) alumina, (b) zinc titanate, (c) at least one compound of molybdenum, (d) at least one compound of at least one of nickel and cobalt, and (e) at least one compound of rhenium. This catalyst composition is used for hydrotreating a liquid hydrocarbon-containing feed stream, which contains organic compounds of sulfur, nitrogen and oxygen under such conditions as to obtain a product having reduced levels of sulfur, nitrogen and oxygen. Preferably the hydrocarbon-containing feed stream contains cycloalkanes, which are at least partially reformed to aromatic compounds.

16 Claims, No Drawings

HYDROTREATING CATALYST COMPOSITION

This application is a division of copending application Ser. No. 858,772, filed May 2, 1986, now U.S. Pat. No. 4,655,906.

BACKGROUND OF THE INVENTION

In one aspect, this invention relates to a catalytic hydrotreating process for removing organic compounds of sulfur, nitrogen and oxygen from liquid hydrocarbon-containing feed streams. In another aspect, this invention relates to the conversion of cycloalkanes, which are contained in these feed streams, to aromatic hydrocarbons. In a further aspect, this invention relates to a catalyst composition comprising alumina, zinc titanate and transition metal compounds. In still another aspect, this invention relates to the use of this catalyst composition in a process for hydrotreating hydrocarbon-containing feed streams, so as to remove organic compounds of sulfur, nitrogen and oxygen therefrom and to convert cycloalkanes contained in these feed streams to aromatic hydrocarbons.

Zinc titanate-containing catalyst compositions are known. Also the use of zinc titanate-containing catalyst compositions for hydrodesulfurizing and hydrodenitrogenating hydrocarbon-containing feed streams, such as heavy crudes and fractions thereof, is known. However, there is an ever present need to improve zinc titanate-containing catalyst compositions and to use them in improved hydrotreating processes.

SUMMARY OF THE INVENTION

It is an object of this invention to provide a new, effective zinc titanate-containing catalyst composition. It is another object of this invention to hydrotreat a hydrocarbon-containing feed stream in the presence of a new, effective zinc titanate-containing catalyst composition. It is a further object of this invention to remove organic compounds of sulfur, nitrogen and oxygen from hydrocarbon-containing feed streams. It is still another object of this invention to convert cycloalkanes contained in these feed streams to aromatic hydrocarbons. Other objects and advantages will be apparent from the detailed description and the appended claims.

In accordance with this invention, a substantially liquid hydrocarbon-containing feed stream, which contains organic sulfur compounds, organic nitrogen compounds and organic oxygen compounds as impurities, is hydrotreated in a process comprising the step of contacting said hydrocarbon-containing feed stream with hydrogen in the presence of a catalyst composition comprising (a) alumina, (b) zinc titanate, (c) at least one compound of molybdenum, (d) at least one compound selected from the group consisting of nickel compounds and cobalt compounds and (e) at least one compound of rhenium, under such conditions as to obtain a hydrocarbon-containing product stream having reduced levels of sulfur, nitrogen and oxygen.

In one embodiment of this invention, the organic oxygen compounds in the hydrocarbon-containing feed stream comprise phenolic compounds (i.e., aromatic hydrocarbons with at least one OH group attached to an aromatic ring). In another embodiment of the hydrotreating process of this invention, the feed stream further comprises cycloalkanes (preferably cyclohexane and/or alkyl-substituted cyclohexanes) which are at least partially converted to aromatic hydrocarbons (preferably benzene and alkyl-substituted benzenes).

In yet another embodiment of this invention, a composition of matter is provided which comprises (a) alumina, (b) zinc titanate, (c) at least one molybdenum compound, (d) at least one compound of at least one of nickel and cobalt and (e) at least one rhenium compound. Preferably zinc titanate has the chemical formula of $Zn_2TiO_4$. Also, the preferred composition of matter of this invention, which is employed as a catalyst composition in the hydrotreating process of this invention, consists essentially of components (a), (b), (c), (d) and (e).

DETAILED DESCRIPTION OF THE INVENTION

Catalyst Composition

The composition of matter (catalyst composition) of this invention can contain any suitable proportions of components (a), (b), (c), (d) and (e). Preferably, the catalyst composition comprises from about 40 to about 90 weight-% (more preferably about 50–80 weight-%) $Al_2O_3$, from about 2 to about 20 weight-% (more preferably about 5–15 weight-%) zinc titanate, from about 1 to about 20 weight-% (more preferably about 2–15 weight-%) Mo, from about 0.5 to about 8 weight-% (more preferably about 1–5 weight-%) Ni or Co or Ni+Co (if both Ni and Co are present), and from about 0.2 to about 4 weight-% (more preferably about 0.3–2 weight-%) Re. Even though the promoter levels (Ni, Co, Mo, Re) are expressed as weight-% metal, these promoters are generally present as oxides, or if the catalyst composition is presulfided, as oxides and sulfides. All weight percentages are calculated based on the finished (i.e., dired and calcined) composition of matter. The surface area of the composition of matter of this invention generally ranges from about 50 to about 400 m²/g, preferably from about 100 to about 250 m²/g (determined by the BET/$N_2$ method; ASTM D3037).

The composition of matter of this invention can be prepared by any suitable method. In one preferred embodiment, high surface area alumina and zinc titanate ($Zn_2TiO_4$) are mixed (preferably dry-blended as powders). The mixture can be impregnated with at least one aqueous solution of compounds of Mo, Ni and/or Co and Re, dried, and calcined under such conditions and at a temperature high enough to at least partially convert the compounds of Mo, Ni and/or Co and Re to their oxides. Optionally, the powder mixture can be impregnated and stirred in a liquid, extruded, dried and calcined (as described above). The impregnation can be carried out sequentially in any order or in one step (using a solution containing compounds of Mo, Ni and Co and Re). Preferably, the a mixture of alumina and $Zn_2TiO_4$ (for the preparation of $Zn_2TiO_4$ see U.S. Pat. Nos. 4,287,050 and 4,371,728, herein incorporated by reference) is impregnated sequentially: first with Mo, then with Ni and/or Co, and finally with Re. Preferably drying and, optionally, calcining steps follow each impregnation step (as exemplified in Example I).

Any suitable compounds of Mo, Ni and/or Co and Re can be used for the impregnation steps, as long as these compounds are substantially soluble in water. Non-limiting examples of suitable molybdenum compounds are molybdic oxides and hydroxides, molybdenum blue, molybdic acids, ammonium orthomolybdates, alkali metal orthomolybdates, ammonium dimolybdates, alkali metal dimolybdates, ammonium heptamolybdates, alkali metal heptamolybdates, ammonium isomolybdates, alkali metal isomolybdates, and mixtures thereof. Non-limiting examples of compounds of nickel and/or cobalt are nitrates, sulfates, bisulfates, bicarbonates, monocarboxylates (such as acetates), di- and tricarboxylates (such as oxalates and citrates), thiocyanates, and mixtures thereof. Non-limiting compounds of rhenium are rhenium oxides (such as $Re_2O_7$), rhenic acids (such as $HReO_4$), ammonium and alkali metal perrhenates (such as $KReO_4$, $NH_4ReO_4$ or $(NH_4)_3ReO_5$) and mixtures thereof. The concentration of the compounds of Mo, Ni and/or Co and Re in the impregnating solutions are selected so as to attain desired weight percentages of these metals in the finished composition of matter. Presently preferred compounds of Mo, Ni and Re and concentrations in impregnating solution are described in Example I.

The drying step (after impregnation) is generally carried out at a temperature in the range of from about 25° to about 200° C. (preferably 50°–120° C.), either in air or in inert gas, either at ambient pressure conditions (about 1 atm) or (less preferably) under vacuum conditions. Generally, the dried composition of matter of this invention or one of its precursors contains less than about 20 weight-% water. The rate of drying is controlled so as to avoid surges of water vapor and splattering. Drying times can range from about 0.5 to about 100 hours (preferably 1–30 hours).

The calcining steps (after drying) comprise heating in a non-reducing atmosphere, either in a free oxygen containing gas (such as air) or (less preferably) in an inert gas atmosphere (e.g., nitrogen or helium), at a temperature in the range of from about 350° C. to about 750° C. (preferably from about 500° C. to about 650° C.). The time for calcining will generally range from about 0.1 to about 20 hours (preferably 0.5–10 hours). During calcining substantially all volatile matter (water, carbonaceous materials) is removed, and the compounds of Mo, Ni and/or Co and Re are substantially converted to their oxides.

If an alumina/zinc titanate powder mixture is impregnated, the calcined composition of matter can be pelletized or compacted into various shapes (e.g., spherical, cylindrical, trilobal) for convenient shipping and use in catalyst beds. Optionally, the composition of matter can be presulfided by contacting the calcined composition of matter with a suitable sulfur compound (such as $H_2S$, COS, mercaptans, disulfides), either in gaseous form or dissolved in a suitable solvent (such as a gas oil) so as to at least partially convert the oxides of Mo, Ni and/or Co and Re to their sulfides. Presulfiding conditions comprise a temperature of about 200°–400° C., and a contacting time of about 1–30 hours. It is within the scope of this invention (yet presently less preferred) to employ methods of preparing the composition of matter of this invention other than the one described above. For instance, Co/Mo-promoted mixtures of alumina and zinc titanate can be prepared in accordance with Example I of U.S. Pat. No. 4,287,050 or in accordance with Example I of U.S. Pat. No. 4,522,709, and these Co/Mo-promoted mixtures can then be impregnated with a rhenium compound, dried and calcined.

Hydrotreating Process

The composition matter of this invention can be used as a catalyst composition for a variety of reactions such as hydrocarbon conversion reactions. In one preferred embodiment of this invention, the catalyst composition of this invention is used as a catalyst for hydrotreating substantially liquid hydrocarbon-containing feed streams, which also contain organic compounds of sulfur, nitrogen and oxygen as impurities, and generally also asphaltenes, coke precursors (measured as Ramsbottom carbon residue) and metal compounds. Suitable hydrocarbon containing feed streams include crude oil and fraction thereof, petroleum products, heavy oil extracts, coal pyrolyzates, liquefied coal products, products from tar sands, shale oil and shale oil products. The catalyst compositions are particularly suited for treating feed streams which also contain substantial amounts of cycloalkanes, such as naphtha/kerosine fractions, light and heavy gas oils (boiling range at 1 atm: about 200°–500° F.), light and heavy cycle oils and gas oils (boiling range at 1 atm: about 400°–800° F.), vaccum gas oil (boiling range at 1 atm: about 800°–1000° F.), shale oil fractions and coal tar fractions. Presently preferred feeds are light cycle oil and naphtha.

Generally the hydrocarbon-containing feed streams contain about 0.05–5.0 (preferably about 0.1–3.0) weight-% sulfur, about 0.01–2.0 (preferably about 0.02–1.0) weight-% nitrogen, and about 0.05–4.0 (preferably about 0.1–2.0) weight-% oxygen. The amount of cycloalkanes in the hydrocarbon-containing feed stream can range from about 10 to about 90 weight-%, and is generally in the range of from about 20 to about 80 (preferably 30–60) weight-%. The $API_{60}$ gravity can range from about 5 to about 40, and is generally in the range of 10 to about 30. The hydrocarbon-containing feed stream generally also contains polyaromatics such as naphthalene and alkyl-substituted naphthalenes. Metals such as Ni, V, Fe and As may also be present in the feed as impurities, generally in very small quantities (about 0.1–10 ppm).

Any suitable organic sulfur compound contained in the hydrocarbon-containing feed may be hydrodesulfurized in accordance with the present invention. Suitable organic sulfur compounds include sulfides, disulfides, mercaptans, thiophenes, benzothiophenes, dibenzothiophenes and the like, and mixtures of two or more thereof.

Any suitable organic nitrogen compound contained in the hydrocarbon-containing feed may be hydrodenitrogenized in accordance with the present invention. Suitable organic nitrogen compounds include amines, diamines, pyridines, quinolines, porphyrins, benzoquinolines and the like and mixtures of two or more thereof.

Any suitable organic oxygen compound contained in the hydrocarbon-containing feed may be hydrodeoxygenated in accordance with the present invention. Suitable organic oxygen compounds include carboxylic acids, esters, ethers, aldehydes, ketones, phenols, resorcinols, hydroquinones, naphthols, and the like, and mixtures of two or more thereof.

Any suitable cycloalkane compound contained in the hydrocarbon-containing feed can be converted (reformed) to aromatic compounds. Suitable cycloalkane include alkyl-substituted or unsubstituted cyclohexanes, cycloheptanes, cyclooctanes, cyclononanes, decalins and the like and mixtures of two or more thereof, preferably cyclohexanes.

The hydrotreating process employing the catalyst composition of this invention can be carried out in any apparatus whereby an intimate contact of the catalyst composition with said hydrocarbon-containing feed stream and a free hydrogen containing gas is achieved, under such conditions as to produce a hydrocarbon containing product having reduced levels of sulfur, nitrogen and oxygen. Generally, a lower level of cycloalkanes and a higher level of aromatic hydrocarbons, as well as lwer Ramsbottom carbon residue and higher API gravity, are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrotreating process can be carried out as a batch process or, preferably, as a continuous process, more preferably in a tubular reactor containing one or more fixed catalyst beds or in a plurality of fixed bed reactors in parallel or in series. The hydrocarbon-containing product stream can be distilled, e.g., in a fractional distillation unit, so as to obtain fractions having different boiling ranges.

The catalyst composition of this invention can be used alone in the hydrotreating process of this invention or may be used in combination with substantially unpromoted refractory materials such as alumina, silica, titania, magnesia, metal silicates, metal aluminates, titania and metal phosphates. Alternating layers of the refractory material and of the catalyst composition can be used, or the catalyst composition can be mixed with the refractory material. Use of the refractory material with the catalyst composition provides for better dispersion of the hydrocarbon-containing feed stream. Even though presently not preferred, other catalysts such as known hydrotreating catalysts (e.g., $NiO/MoO_3$, $CoO/MoO_3$ and $NiO/CoO/MoO_3$ on alumina) may be used in a mixture with the catalyst composition of this invention to achieve simultaneous deoxygenation, desulfurization, denitrogenation, hydrogenation, demetallization and hydrocracking, if desired. It is also within the scope of this invention, to use a layer of the catalyst composition of this invention and one or more layers of these other hydrotreating catalysts in one reactor (stacked catalyst beds), or to use a reactor containing the catalyst invention in conjunction with one or more reactors in series containing these other hydrotreating catalysts, so as to achieve the simultaneous hydrotreating results as cited above.

Any suitable reaction time (contact time) between the catalyst composition, the hydrocarbon containing feed stream and hydrogen gas can be utilized. In general, the reaction time will range from about 0.05 hours to about 10 hours, preferably from about 0.4 to about 5 hours. In a continuous fixed bed operation, this generally requires a liquid hourly space velocity (LHSV) in the range of about 0.10 to about 10 cc of feed per cc of catalyst per hour, preferably from about 0.2 to about 2.5 cc/cc/hr.

The hydrotreating process employing the catalyst composition of the present invention can be carried out at any suitable temperature. The temperature will generally be in the range of about 250° C. to about 500° C. and will preferably be in the range of about 300° C. to about 420° C. Higher temperatures do improve the removal of impurities but temperatures which will have adverse effects on the hydrocarbon containing feed stream, such as excessive coking, will usually be avoided. Also, economic considerations will usually be taken into account in selecting the operating temperature. Lower temperatures than 250° C. (e.g., about 230° C.) can generally be used for lighter feeds such as naphtha streams.

Any suitable pressure may be utilized in the hydrotreating process. The reaction pressure will generally be in the range of about atmospheric pressure (0 psig) to up to 5,000 psig. Preferably, the pressure will be in the range of about 100 to about 2500 psig. Higher pressures tend to reduce coke formation but operating at high pressure may be undesirable for safety and economic reasons.

Any suitable quantity of hydrogen can be added to the hydrotreating process. The quantity of hydrogen used to contact the hydrocarbon containing feed stock will generally be in the range of about 100 to about 10,000 standard cubic feet $H_2$ per barrel of the hydrocarbon containing feed stream and will more preferably be in the range of about 1,000 to about 5,000 standard cubic feet $H_2$ per barrel of the hydrocarbon containing feed stream. Either pure hydrogen or a free hydrogen containing gas mixture (e.g., $H_2$ and $CH_4$, or $H_2$ and $CO$, or $H_2$ and $N_2$) can be used.

In general, the catalyst composition is utilized primarily for desulfurization, denitrogenation, deoxygenation and reforming (conversion of cycloalkanes to aromatics). The time in which the catalyst composition of this invention will maintain its activity for the above process will depend upon the hydrotreating conditions and the catalyst composition of the hydrocarbon-containing feed. Generally, the temperature of the hydrotreating process is gradually increased to compensate for loss of catalyst activity due to fouling (e.g., due to coke deposits). The catalyst can, if desired, be regenerated when its activity has dropped below a desired level. Catalyst regeneration can be carried out by discontinuing the flow of hydrogen and of the hydrocarbon-containing feed stream and then heating the catalyst composition in a free oxygen containing gas atmosphere (such as air) under such conditions as to remove carbonaceous materials and to at least partially convert sulfides of Mo, Co and/or Ni and Re back to their oxides. Generally the catalyst regeneration step is carried out at about 400°–650° C. and at a pressure of about 0–1,000 psig.

At least a portion of the hydrotreated product stream of this invention can subsequently be isomerized or can be cracked, e.g., in a fluidized catalytic cracking unit under such conditions as to produce lower boiling hydrocarbon materials suitable for use as fuels and other useful products. It is within the scope of this invention to hydrotreat the product stream having reduced S, N and O contents in a process using a different catalyst composition, such as alumina-supported $NiO/MoO_3$ or $CoO/MoO_3$ catalysts, for further removal of sulfur and other impurities (e.g., metals) before the product stream is introduced into a cracking reactor and treated under cracking conditions, or before the product stream is isomerized.

The following examples are presented in further illustration of the invention and are not to be considered as unduly limiting the scope of this invention.

EXAMPLE I

This example illustrates the preparation of promoted zinc titanate/alumina catalysts.

Control Catalyst A was Mo/Ni-impregnated zinc titanate/alumina and was prepared as follows: A mixture of about 10 weight-% zinc titanate and about 90 weight-% alumina, which was made by intimate dryblending of appropriate amounts of $Zn_2TiO_4$ and $Al_2O_3$, was impregnated with compounds of nickel and molybdenum. 130.5 grams of the above zinc titanate/alumina mixture were treated with 125 cc of an aqueous solution having a concentration of 173.2 grams of $(NH_4)_6Mo_7O_{24}.4H_2O$ per liter solution. The thus treated $Zn_2TiO_4/Al_2O_3$ mixture was dried and then calcined at about 1000° F. for about 4 hours in air. 147.6 grams of the Mo-impregnated $Zn_2TiO_4/Al_2O_3$ were treated with 109 cc of an aqueous solution having a concentration of 198.2 grams of $Ni(NO_3)_2.6H_2O$ per liter of solution. The thus treated material was dried and calcined in air at about 1000° F. for about 4 hours. The Mo/Ni-impregnated $Zn_2TiO_4/Al_2O_3$ contained 7.13 weight-% Mo (calculated as Mo metal; present as oxide(s) of Mo) and 2.81 weight-% Ni (calculated as Ni metal; present as oxide(s) of Ni) and had a surface area ($BET/N_2$ method; ASTM D3037) of 173 $m^2/g$.

Invention Catalyst B was Re/Mo/Ni-impregnated zinc titanate/alumina and was prepared as follows. 22.78 grams of Catalyst A was treated with 25 cc of an aqueous solution having a concentration of 9.6 grams $NH_4ReO_4$ (ammonium perrhenate) per liter solution. The thus impregnated material was dried and calcined in air at about 1000° F. for about 4 hours.

Catalyst B contained 0.86 weight-% Re (calculated as Re metal; present as oxide(s) of Re) and had a surface area of 171 $m^2/g$.

Control Catalyst C was Mo/Co-impregnated $Zn_2TiO_4/Al_2O_3$. It was prepared by impregnating a dry-blended mixture of zinc titanate and alumina (see under Catalyst A) with aqueous solutions of molybdenum and cobalt compounds, substantially in accordance with the procedure for Catalyst A, except that a cobalt compound was used instead of a nickel compound. Calcined Catalyst C had a surface area of 181 $m^2/g$ and contained 5.09 weight-% CoO, 14.19 weight-% $MoO_3$, 4.64 weight-% ZnO, 2.10 weight-% $TiO_2$, $Al_2O_3$ as the balance.

Invention Catalyst D was Re/Mo/Co-impregnated zinc titanate/alumina and was prepared by impregnating 15 cc of Catalyst C with an aqueous solution containing 0.96 gram $NH_4ReO_4$ per 100 cc solution so as to attain a dried material (heated at about 200° C. under vacuum) that contained about 0.5 weight-% Re.

Invention Catalyst D' was prepared in a similar manner as Catalyst D but contained about 1 weight-% Re. About 72 cc of an aqueous solution of $HReO_4$ (containing 1.3 g Re) was used to impregnate Catalyst C.

EXAMPLE II

This example illustrates the use of various promoted zinc titanate catalysts (described in Example I) for the removal of sulfur from a light cycle oil feed ($API_{60}$ gravity: about 21; sulfur content: 1.57 weight-%; polyaromatics content: 40 weight-%). The sulfur control was determined by X-ray fluoresence spectrometry; the polyaromatics (aromatic hydrocarbons with condensed benzene rings) were analyzed by mass spectrometry.

The oil feed was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 30 cc of low surface area α-alumina (14 mesh Alundum; surface area less than 1 $m^2$/gram), a middle layer of 12.5 cc of one of the hydrofining catalysts described in Example I mixed with 37.5 cc of 36 mesh Alundum, and a bottom layer of about 30 cc of Alundum.

Hydrogen was introduced in the reactor through a tube that concentrically surrounded the oil induction tube but extended only as far as the reactor top. The reactor was heated with a 3-zone furnace. The reactor temperature was measured in the catalyst bed at three different locations by three separate thermocouples embedded in an axial thermocouple well (0.25 inch out diameter). The liquid product oil was generally collected every day for analysis. The hydrogen gas was vented. Reaction conditions comprised a pressure of about 600 psig, a liquid hourly space velocity (LHSV) of about 4.0 cc oil/cc catalyst/hour and a temperature ranging from 495° F. to 675° F. Pertinent hydrotreating results are summarized in Table I.

TABLE 1

| Catalyst Temperature (°F.) | Run 1 (Control) A (Mo/Ni) | Run 2 (Invention) B (Mo/Ni/Re) | Run 3 (Control) C (Mo/Co) | Run 4 (Invention) D (Mo/Co/Re) |
|---|---|---|---|---|
| % Removal of Sulfur | | | | |
| 495 | 39 | 41 | 44 | 52 |
| 525 | 52 | 57 | 66 | 69 |
| 550 | 63 | 72 | 76 | 79 |
| 575 | 68 | 82 | 82 | 85 |
| 600 | 80 | 86 | 87 | 90 |
| 625 | 87 | 90 | 90 | 93 |
| 650 | 92 | 93 | 93 | 95 |
| 675 | 95 | 95 | 94 | 96 |
| % Removal of Polyaromatics | | | | |
| 495 | 19 | 20 | 8 | 16 |
| 550 | 33 | 38 | 26 | 27 |
| 600 | 53 | 61 | 42 | 51 |
| 625 | 65 | 67 | 51 | 60 |
| 650 | 69 | 71 | 61 | 62 |

Data in Table I clearly show that the removal of sulfur and the removal of polyaromatics (by hydrogenation) from the feed was consistently higher when Re-containing catalyst B and D were used (compare run 2 with run 1 and run 4 with run 3).

EXAMPLE III

This example illustrates the removal of organic compounds which contain chemically bound oxygen, sulfur and nitrogen from a naphtha fraction of a coal tar by hydrotreatment of a Re/Co/Mo-promoted zinc titanate (alumina catalyst) (Catalyst D'). The composition of the feed and of products hydrotreated in runs 5 and 6 in the presence of Catalyst D' and pertinent process conditions are summarized in Table II.

TABLE II

| | Feed | Product of Run 5 | Product of Run 6 |
|---|---|---|---|
| Reaction Temp. (°C.) | — | 345 | 350 |
| $H_2$ Pressure (psig) | — | 700 | 1200 |
| LHSV | — | 1.0 | 1.0 |
| Average Molecular Weight | 116 | 119 | 112 |
| ppmw O | 6300 | 1900 | —[1] |
| ppmw S | 4400 | 8 | 56 |
| ppmw N | 640 | —[1] | 69 |
| Benzenes[2] (wt %) | 18.4 | 28.5 | 54.3 |
| Cyclohexanes[3] (wt %) | 42.8 | 42.9 | 19.6 |
| Indanes[4] (wt %) | 6.8 | 13.2 | 18.3 |
| Naphthalenes[5] (wt %) | 2.4 | 2.9 | 3.0 |
| Phenols[6] (wt %) | 8.2 | 0.5 | 0.3 |
| Decalins and Resorcinols (wt %) | 20.5 | 11.6 | 3.2 |

TABLE II-continued

|  | Feed | Product of Run 5 | Product of Run 6 |
|---|---|---|---|
| Others[8] (wt %) | 0.4 | 0.5 | 0.3 |

[1] not determined
[2] determined by mass spectrometry; 78 type compounds; average molecular weight: 107-117
[3] determined by mass spectrometry; 94 type compounds; average molecular weight: 105-113
[4] determined by mass spectrometry; 118 type compounds; average molecular weight: 128-131
[5] determined by mass spectrometry; 128 type compounds; average molecular weight: 107-122
[6] determined by mass spectrometry; 94 type compounds; average molecular weight: about 111
[7] determined by mass spectrometry; 138 type compounds; average molecular weight: 126-133
[8] Indenes and naphthenbenzenes; determined by mass spectrometry Data in Table I demonstrate that hydrotreatment of a hydrocarbon-containing feed stream, in particular a coal liquid fraction which contains organic, oxygen, sulfur and nitrogen compounds, in the presence of a Re/Mo/Co-promoted zinc titanate/alumina catalyst resulted in simultaneous removal of most of these O-, N- and S-compounds (especially phenols and resorcinols) and in the conversion of the feed to a product (useful as motor fuel) having a higher aromatics content.

Reasonable variations and modifications are possible within the scope of the disclosure and the appended claims.

We claim:

1. A composition of matter, suitable as a catalyst composition for hydrotreatment of liquid polyaromatics-containing feed streams, comprising:
   (a) alumina,
   (b) zinc titanate,
   (c) at least one compound of molybdenum,
   (d) at least one compound of nickel, and
   (e) at least one compound of rhenium;
wherein said composition of matter comprises from about 1 to about 20 weight-% Mo, from about 0.5 to about 8 weight-% Ni and from about 0.2 to about 4 weight-% Re.

2. A composition of matter in accordance with claim 1 comprising from about 40 to about 90 weight-% $Al_2O_3$ and from about 2 to about 20 weight-% zinc titanate.

3. A composition of matter in accordance with claim 2 having a surface area in the range of from about 50 to about 400 $m^2/g$.

4. A composition of matter in accordance with claim 1 comprising from about 50 to about 80 weight-% $Al_2O_3$, from about 5 to about 15 weight-% zinc titanate, from about 2 to about 15 weight-% Mo, from about 1 to about 5 weight-% Ni, and from about 0.3 to about 2 weight-% Re.

5. A composition of matter in accordance with claim 4 having a surface area in the range of from about 100 to about 250 $m^2/g$.

6. A composition of matter in accordance with claim 1, wherein component (c) comprises at least one oxide of molybdenum, component (d) comprises at least one oxide of nickel, and component (e) comprises at least one oxide of rhenium.

7. A composition of matter in accordance with claim 1, wherein said composition of matter has been presulfided, component (c) comprises at least one sulfide of molybdenum, component (d) comprises at least one sulfide of nickel, and component (e) comprises at least one sulfide of rhenium.

8. A composition of matter in accordance with claim 1, having been prepared by a process comprising the steps of:
   (i) mixing alumina and zinc titanate;
   (ii) impregnating the mixture of alumina and zinc titanate obtained in step (i) with at least one aqueous solution containing compounds of Mo, of Ni and of Re;
   (iii) drying the thus impregnated mixture obtained in step (ii);
   (iv) calcining the dried mixture obtained in step (iii) under such conditions and at a temperature high enough to convert the compounds of Mo, of Ni and of Re to oxides of Mo, of Ni and of Re.

9. A composition of matter in accordance with claim 8 wherein said calcining is carried out in a free oxygen containing gas at a temperature in the range of from about 350° to about 750° C.

10. A composition of matter in accordance with claim 8, wherein said drying in step (iii) is carried out at a temperature in the range of from about 25° to about 200° C., and said calcining in step (iv) is carried out at a temperature in the range of from about 500° to about 650° C.

11. A composition of matter in accordance with claim 8, wherein said drying in step (iii) is carried out for a period of time in the range of from about 0.5 to about 100 hours, and said calcining in step (iv) is carried out at a temperature in the range of from about 0.1 to about 20 hours.

12. A composition of matter in accordance with claim 8, wherein said aqueous solution formed in step (ii) comprises at least one compound of Mo selected from the group consisting of molydbic oxides, molybdic hydroxides, molybdenum blue, molybdic acids, ammonium orthomolybydates, alkali metal orthomolybdates, ammonium dimolybdates, alkali metal dimolybdates, ammonium heptamolybdates, alkali metal heptamolybdates, ammonium isomolybdates, and alkali metal isomolybdates; at least one compound of Ni selected from the group consisting of nickel nitrate, nickel sulfate, nickel bisulfate, nickel bicarbonate, nickel monocarboxylates, nickel dicarboxylates, nickel tricarboxylates and nickel thiocyanate; and at least one compound of Re selected from the group consisting of rhenium oxides, rhenic acids, ammonium perrhenates and alkali metal perrhenates.

13. A composition of matter in accordance with claim 8, comprising the additional step of (v) contacting the material obtained in step (iv) with a sulfur compound under such conditions as to at least partially convert oxides of Mo, Ni and Re to sulfides of Mo, Ni and Re.

14. A composition of matter in accordance with claim 12, where said sulfur compound is selected from the group consisting of $H_2S$, COS, mercaptans and disulfides.

15. A composition of matter in accordance with claim 12, wherein contacting step (v) is carried out at a temperature in the range of from about 200° to about 400° C.

16. A composition of matter in accordance with claim 14, wherein said contacting step (v) is carried out for a period of time in the range of from about 1 to about 30 hours.

* * * * *